United States Patent Office 2,911,391
Patented Nov. 3, 1959

2,911,391

POLYMER HYDROPEROXIDES

Edwin J. Vandenberg, Wilmington, Del., assignor to Hercules Powder Company, Wilmington, Del., a corporation of Delaware No Drawing. Application December 31, 1952
Serial No. 329,132

16 Claims. (Cl. 260—78.5)

This invention relates to new hydroperoxides and, more particularly, to the hydroperoxides of polymers having recurring units which contain a cyclic nucleus and an oxidizable hydrogen and the preparation of such polymer hydroperoxides.

In accordance with this invention, it has been found that polymers containing hydroperoxy groups may be produced by the oxidation, in liquid phase with a gas containing free oxygen, of a polymer which has recurring units containing a cyclic nucleus and an oxidizable hydrogen attached to the cyclic nucleus or to a radical attached to the cyclic nucleus. Such oxidizable hydrogens are hydrogen attached to secondary and tertiary carbons in an alkyl substituent on the cyclic nucleus and adjacent to the cyclic nucleus and hydrogen attached to secondary and tertiary carbons of a cycloaliphatic nucleus. These hydroperoxides are readily obtained by the oxidation of such polymers in liquid state with free oxygen and accordingly polymer hydroperoxides having a very high percentage of hydroperoxide groups may be produced, particularly those prepared from polymers whose recurring units contain an aryl nucleus with hydrogen attached to a tertiary carbon of a hydrocarbon substituent thereon. In addition, the oxidation of these polymers to the polymer hydroperoxide takes place with little or no substantial amount of degradation of the polymer.

The preparation of the polymer hydroperoxides in accordance with this invention will be illustrated by the following examples, as will various applications of these new products.

*Example 1*

The polyisopropyl-α-methylstyrenes used in this example and Examples 2–7 below were prepared by the low temperature acid polymerization of either mixed isopropyl-α-methylstyrenes or the isolated isomers thereof according to the following typical procedure. Isopropyl-α-methylstyrene was prepared by reducing a commercial diisopropylbenzene monohydroperoxide (mixture of meta and para isomers) and distilling to obtain isopropyl-α,α-dimethylbenzyl alcohol (mixture of meta and para isomers) which was then dehydrated to the mixed isopropyl-α-methylstyrenes. To obtain the individual isomers, this crude mixture was fractionated in a 75-plate column at 50 mm. pressure and a 75:1 reflux ratio whereby a pure m-isopropyl-α-methylstyrene was obtained and a relatively pure p-isopropyl-α-methylstyrene (containing about 4% of the meta isomer and less than 2% of an ortho isomer) was obtained. Sixty parts of either the pure isomers or mixtures of the isomers was polymerized by dissolving in 303 parts of toluene, removing any traces of water, replacing the air with dry nitrogen, and after lowering the temperature to a −70° C., bleeding boron trifluoride into a stream of nitrogen passing into the reaction vessel. There was an immediate exothermic reaction which caused the temperature to rise about 15° C. in a few minutes. After about 30 minutes, the temperature fell to the initial reaction temperature. The polymer was recovered from the viscous reaction mixture by adding the reaction mixture to 2000 parts of a well-agitated methanol. The precipitated polymer was collected by filtration, washed twice with methanol, and then dried at reduced pressure for 16 hours at 80° C.

A polyisopropyl-α-methylstyrene obtained by polymerizing a mixture of the meta and para isomers was oxidized to the corresponding hydroperoxide by co-oxidation in cumene. Four hundred parts of the polymer was dissolved in 1600 parts of cumene and to this solution were added 20 parts of calcium hydroxide and 26.7 parts of 75% cumene hydroperoxide. Oxygen was bubbled through this reaction mixture held at 90° C. at the rate of about 4 cc./sec. At a given degree of oxidation, the reaction mixture was filtered to remove the insolubles and the polyisopropyl-α-methylstyrene hydroperoxide was recovered by pouring the filtered solution into methanol with agitation. It was washed twice with methanol and then dried at room temperature in vacuo. In order to completely remove the cumene hydroperoxide from the polymer hydroperoxide, it was redissolved in benzene (20% concentration) and reprecipitated in methanol. The time of the oxidation on three such runs and the percent substitution in the final polyisopropyl-α-methylstyrene hydroperoxide obtained at various degrees of oxidation (represented as percent cumene hydroperoxide in the final solution) are set forth below:

| Hours at 90° C. | Total ROOH as Percent Cumene Hydroperoxide | Percent Substitution in Polymer Hydroperoxide | Specific Viscosity (1% Benzene) of Polymer Hydroperoxide |
|---|---|---|---|
| 24 | 2.9 | 2.7 | |
| 47 | 6.3 | 7.2 | 0.20 |
| 92 | 25.4 | 27.5 | 0.22 |

In this and the following examples, the hydroperoxide content of the polymer will be expressed as "percent substitution" or "percent substituted," i.e., the number of hydroperoxide groups per 100 oxidizable monomer units in the polymer.

A graft polymer of the polyisopropyl-α-methylstyrene hydroperoxide (2.7% substituted) and vinyl acetate was prepared according to the following polymerization formula:

|   | Parts |
|---|---|
| Polymer hydroperoxide | 100 |
| Vinyl acetate | 200 |
| Benzene | 500 |
| Ferric acetylacetonate | 0.01 |
| Benzoin | 2 |
| Triethylamine | 0.5 |

After 18 hours at 40° C. a total solids indicated that about 37% of the vinyl acetate had polymerized. The benzene solution of the grafted polymer so obtained was clear, demonstrating that the polymer was soluble in benzene.

A grafted polymer of the polyisopropyl-α-methylstyrene hydroperoxide (7.2% substituted) and methyl methacrylate was prepared by the same polymerization procedure except that 400 parts of the monomer was used per 100 parts of polymer hydroperoxide, 1850 parts of benzene, and 4 parts of benzoin. After 18 hours at 40° C. the solids content indicated that 46% of the methyl methacrylate had been polymerized. The grafted polymer so obtained was soluble in benzene.

*Example 2*

The polyisopropyl-α-methylstyrene used in this example was a mixture of the meta and para isomers in the ratio 1.9:1, respectively, and had a specific viscosity (1% benzene) of 0.06. Fifty parts of this polymer and 2 parts of 75% cumene hydroperoxide were dissolved in 100 parts of cumene and 3 parts of calcium hydroxide was dispersed therein. The reaction mixture was heated and held at 90° C. while oxygen was introduced into the reaction mixture at the rate of about 2 cc./sec. through a gas disperser. After 73 hours, the reaction mixture had a total hydroperoxide content equivalent to 38.2% cumene hydroperoxide. The insolubles were then removed by filtration. The polyisopropyl-α-methylstyrene hydroperoxide was recovered by precipitation of the reaction mixture into n-pentane. The precipitate so obtained was dried under reduced pressure for 16 hours at room temperature. It was then further purified by dissolving in 110 parts of benzene and reprecipitating with n-pentane. After again drying, there was obtained 46.7 parts of a hard, brittle yellow resin. Analysis of this resin showed the polyisopropyl-α-methylstyrene hydroperoxide was 47% substituted. It was soluble in methanol, acetone, and benzene and insoluble in water and dilute or concentrated sodium hydroxide. It had a specific viscosity (1% benzene) of 0.05. The total oxygen content by direct analysis was 11.0%, whereas the oxygen present as hydroperoxide was 9.3%, showing that a high yield of hydroperoxide had been obtained.

Ten parts of this 47% substituted polyisopropyl-α-methylstyrene hydroperoxide was dissolved in 90 parts of acetone and 0.55 part of concentrated sulfuric acid was added. An immediate exothermic reaction occurred and the temperature rose from room temperature to 38° C. in 5 minutes. After 0.5 hour, analysis of a 1-cc. aliquot for hydroperoxide indicated that only 7% of the original hydroperoxide remained undecomposed. After 2 hours only 3% of the original hydroperoxide remained, and after 3 hours 2.0 parts of sodium bicarbonate and 20 parts of water were added. After another 10 minutes, 1000 parts of water was added. The precipitate so produced was collected by filtration, washed with water, and then dried under reduced pressure for 16 hours at room temperature. The polyphenol so obtained amounted to 8.1 parts. It was a light tan powder and was soluble in acetone, methanol, and benzene. It was swollen by 10 or 20% sodium hydroxide and was dissolved therein by adding a small amount of ethanol. It had a specific viscosity (1% benzene) of 0.04. Its ultraviolet absorption was similar to a typical phenol and gave positive proof for the formation of phenol groups. The intensity of the absorption was equivalent to that which would be given by a product containing 36% p-isopropyl phenol. The theoretical content based on a 47% substituted polyisopropyl-α-methylstyrene hydroperoxide would be 47%. This polymeric phenol was found to be an excellent anti-oxidant when tested in a synthetic lubricant.

Example 3

Thirty parts of a polyisopropyl-α-methylstyrene prepared from pure m-isopropyl-α-methylstyrene and having a specific viscosity (1% benzene) of 0.07 was dissolved in 60 parts of t-butyl benzene containing 0.20 part of 75% cumene hydroperoxide and 0.9 part of calcium hydroxide. The reaction mixture was heated to 110° C. and held at that temperature while oxygen was passed into the reaction mixture at the rate of about 2 cc./sec. A periodic check of the hydroperoxide content of the reaction mixture gave the following results:

| Reaction time, hours: | Percent substitution of polymer charged |
|---|---|
| 17.5 | 10.2 |
| 41.5 | 22.7 |
| 49.5 | 37.5 |
| 66 | 39.6 |
| 71 | 37.4 |

At the end of this time, 250 parts of benzene was added and insoluble calcium hydroxide which remained was removed by centrifugation. The reaction mixture was concentrated by vacuum-stripping at room temperature to 124 parts. The poly-m-isopropyl-α-methylstyrene hydroperoxide was precipitated by adding this concentrated reaction mixture to 1200 parts of n-pentane with agitation. The precipitate was filtered and washed twice with n-pentane, after which the precipitate was dried for 43 hours in vacuo at room temperature. The polymer hydroperoxide so obtained amounted to 27.8 parts and analysis showed that it contained 29.4% poly-m-isopropyl-α-methylstyrene hydroperoxide. It had a specific viscosity (1% benzene) of 0.07. The total oxygen content was 11.6 and the oxygen present as polymer hydroperoxide was 5.9%. Thus this product contained as much of other oxidation products (chiefly polymeric tertiary alcohol along with some polymeric ketone) as hydroperoxide and demonstrates the variations in the product that can be made by controlling oxidation conditions.

Twenty-five parts of this poly-m-isopropyl-α-methylstyrene hydroperoxide was dissolved in 200 parts of acetone, and 1.29 parts of concentrated sulfuric acid dissolved in 25 parts of acetone was added. The temperature rose in 15 minutes from 29° C. to 36° C. and then gradually decreased. After 2 hours, analysis of an aliquot of the reaction mixture indicated that only 4% of the original hydroperoxide remained. After 2.5 hours, 26.5 parts of 1.02 N sodium hydroxide was added to neutralize the sulfuric acid. One thousand parts of water was then added and the precipitate collected, washed with water, and then dried under reduced pressure for 2 days at room temperature. The yield of polymeric phenol so obtained amounted to 20.6 parts which is equivalent to 93% of the theoretical yield. It was soluble in acetone and methanol but was insoluble in benzene. Its ultraviolet absorption was similar to that which would be given by a product containing 30% m-isopropyl phenol (theory=28%).

Example 4

Thirty parts of a polyisopropyl-α-methylstyrene, prepared from pure p-isopropyl-α-methylstyrene, having a specific viscosity (1% benzene) of 0.84, was oxidized exactly as described in Example 3. After 17.5 hours of oxidation at 110° C., the reaction solution contained a total hydroperoxide equivalent to 11.0% substitution (based on polyisopropyl-α-methylstyrene charged; 10.5% if corrected for the cumene hydroperoxide added as initiator). The reaction mixture was diluted with an equal volume of benzene and centrifuged and filtered to remove the insoluble calcium hydroxide that remained. The poly-p-isopropyl-α-methylstyrene hydroperoxide was then precipitated by adding the reaction mixture to 2000 parts of methanol with agitation. It was collected by filtration, washed twice with methanol, and dried for 16 hours under reduced pressure at room temperature whereby there was obtained 28.4 parts. Analysis of this product showed that it was 9.9% substituted. It had a specific viscosity (1% benzene) of 0.89 and contained 2.6% total oxygen, the oxygen present as polymer hydroperoxide being 2.0%.

The use of this poly-p-isopropyl-α-methylstyrene hydroperoxide for the preparation of a polyphenol was demonstrated by dissolving 5 parts of it in a mixture of 15 parts of acetone and 5 parts of benzene, and adding a mixture of 1 part of acetone and 0.11 part of concentrated sulfuric acid, whereupon the temperature of the reaction mixture rose to about 35° C. After 5 hours, analysis of an aliquot of the reaction mixture showed that only 3% of the original hydroperoxide remained. After 18 hours at room temperature, the same hydroperoxide analysis was obtained. The sulfuric acid in the reaction mixture was then neutralized by adding 0.96 part of 1.97 N potassium hydroxide in methanol. After agitating for 1 hour, the polymeric phenol was precipitated by pouring the reaction mixture into 250 parts of methanol. It was collected by filtration, washed once with water and twice with methanol, after which it was dried for 16 hours under reduced pressure at room temperature. Analysis of the product indicated that it contained a maximum of 1% of the original amount of hydroperoxide. It had a specific viscosity (1% benzene) of 0.87. Ultraviolet absorption examination of the product showed the presence of phenolic groups equivalent to 7.9% p-isopropyl phenol (theory=9.1%).

The use of this poly-p-isopropyl-α-methylstyrene hydroperoxide (9.9%) as a catalyst for the bulk polymerization of styrene was demonstrated by adding 1.00 part of it to 9 parts of an inhibitor-free styrene charged into a polymerization vessel which was then swept out with nitrogen. The reaction mixture was then heated to 90° C. After 3 hours, the contents of the polymerization vessel were solid. After 22.5 hours, the polystyrene was removed from the polymerization vessel. It was found to be very tough and at 170°–200° C., it was more viscous than commercial polystyrene but was still thermoplastic. This polystyrene was partly insoluble in benzene and formed a highly swollen gel in methylene chloride. Ultraviolet examination of the methylene chloride solution, after filtering off the gelled polystyrene, showed that only 0.28% of the original styrene had not polymerized and that approximately one-half of the polystyrene had been filtered and was thus in the gelled, cross-linked form.

This 9.9% substituted poly-p-isopropyl-α-methylstyrene hydroperoxide was also used as a catalyst for the emulsion polymerization of butadiene and styrene. Into a polymerization vessel was charged a solution of 5.64 parts of the potassium salt of disproportionated rosin in 103.3 parts of water and adjusted to a pH of 11, 50 parts of styrene, 0.40 part of dodecyl mercaptan, and 1.28 parts of the polymer hydroperoxide. Fifty parts of butadiene was then added in a manner to remove air from the reaction vessel. The polymerization vessel was heated to 65° C. and 0.055 part of dextrose in 16.7 parts of water was injected to start the polymerization. The degree of polymerization was measured by determining the pressure of the reaction mixture and comparing this with a previously determined calibration curve of pressure vs. percent conversion. After 24 hours, 72% conversion was attained and the reaction mixture was a solid mass of polymer.

*Example 5*

A copolymer of p-isopropyl-α-methylstyrene and methacrylic acid was prepared by copolymerization of the two monomers in a 1:3 mole ratio in benzene solution at 65° C. using benzoyl peroxide as the catalyst. After 19 hours, the copolymer had precipitated out to make the entire reaction mixture a solid mass. The copolymer was collected by filtration, washed with benzene, and dried. It was insoluble in water, but was soluble in dilute alkali and ethanol. It had a specific viscosity of 0.27 (1% ethanol) and an acid number of 415 (theory for methacrylic acid is 652). Based on the acid number, the copolymer contained 36.3% p-isopropyl-α-methylstyrene.

This p-isopropyl-α-methylstyrene-methacrylic acid copolymer was oxidized by bubbling oxygen through a solution comprising 7.91 parts of the copolymer, 2.60 parts of sodium hydroxide, 21.1 parts of tert-butyl alcohol, 0.38 part of potassium persulfate, and 55.6 parts of water at 65° C. for 43 hours. The reaction mixture was then diluted with about 60 parts of an 80:20 water:tert-butyl alcohol mixture and the product was precipitated by adding about 20 parts of glacial acetic acid. About 300 parts of water was added and the gelatinous precipitate was centrifuged out. The precipitate was resuspended in water, recentrifuged, filtered to a paste, washed with water, and finally dried. An iodometric analysis of the product showed it to have 4.1% of its p-isopropyl aryl groups converted to hydroperoxide.

A graft of this hydroperoxide of p-isopropyl-α-methylstyrene—methacrylic acid copolymer and styrene was prepared using the following polymerization formula:

| | Parts |
|---|---|
| Copolymer hydroperoxide | 2.00 |
| Styrene | 2.00 |
| Water | 13.4 |
| Sodium hydroxide | 0.60 |
| Ferric iron (calculated as Fe but added as sulfate) | 0.00017 |
| Sodium pyrophosphate | 0.015 |
| Dextrose | 0.10 |

All of the ingredients except the dextrose and 2 parts of water were charged to a polymerization vessel, the air in the vessel was replaced with nitrogen, and after heating the mixture to 30° C., the dextrose in water was injected. A very rapid polymerization took place, the reaction mixture barely flowing after 1 hour. At 2 hours, a solids sample showed that the styrene was 99% polymerized. The product was a very viscous, turbid solution. It was readily diluted with water to give an opalescent solution which showed definite foam stabilization. It also gave an opalescent solution when diluted with methanol. In neither case were any visible particles of polystyrene present, demonstrating that true graft polymer formation had occurred.

A graft of the hydroperoxide of p-isopropyl-α-methylstyrene—methacrylic acid copolymer and acrylamide was prepared using the same polymerization formula except that 4.00 parts of acrylamide and three times as much water were used. The polymerization was carried out at 30° C. After 5 hours, the reaction mixture was a very viscous, clear solution and a solids on an aliquot showed that the acrylamide was completely polymerized.

A polyphenol was prepared from the hydroperoxide of p-isopropyl-α-methylstyrene-methacrylic acid copolymer by acid cleavage. Two parts of the hydroperoxide was dissolved in 20 parts of a 75:25 mixture of acetone and water and 0.4 part of sulfuric acid was added. The reaction mixture was refluxed for 6 hours, after which the sulfuric acid was neutralized by adding 1.6 parts of 5 N aqueous sodium hydroxide. The product was then precipitated by adding the reaction mixture to 200 parts of water with agitation. It was separated by filtration, washed twice with water, and then dried for 16 hours at room temperature under reduced pressure. Iodometric analysis showed that at least 92% of the hydroperoxide had been decomposed. Ultraviolet absorption examination indicated that in addition to phenolic groups there was present in the polyphenol another chromophoric group. The latter group is believed to be an acetyl group which could have arisen by ester formation between the phenol groups and the methacrylic acid groups followed by a Fries rearrangement to an acetyl-substituted phenol.

*Example 6*

A copolymer of p-isopropyl-α-methylstyrene and maleic anhydride was prepared by charging the following ingredients into a sealed polymerization vessel in the absence of air and heating the mixture to 65° C.

| | Parts |
|---|---|
| p-Isopropyl-α-methylstyrene | 20.0 |
| Maleic anhydride | 12.3 |
| Benzene | 129.0 |
| Benzoyl peroxide | 0.16 |

At the end of 21.5 hours, a taffylike lower layer had separated. The reaction mixture was made homogeneous by adding 150 parts of acetone. The copolymer was recovered by adding the reaction mixture solution to 2000 parts of n-pentane with agitation. After washing the precipitate twice with n-pentane, it was vacuum-dried. This copolymer was insoluble in benzene, ethanol, and dilute aqueous sodium hydroxide, and was soluble in acetone, methyl ethyl ketone, and dioxane. It had a specific viscosity of 0.36 (1% methyl ethyl ketone).

The above copolymer was hydrolyzed in order to convert it into its sodium salt which is water-soluble. This was done by adding aqueous sodium hydroxide to an acetone solution of the copolymer and finally water. The hydrolyzed polymer was recovered by acidifying the solution with concentrated hydrochloric acid, filtering, washing with water, and drying. The hydrolyzed copolymer was soluble in ethanol, dilute aqueous sodium hydroxide, and acetone.

The hydrolyzed p-isopropyl-$\alpha$-methylstyrene—maleic anhydride copolymer was oxidized by bubbling oxygen through a solution comprising 10.0 parts of the polymer, 3.1 parts of sodium hydroxide, 0.20 part of potassium persulfate and 86.9 parts of water at 90° C. Iodometric analysis of aliquots showed the following rate of hydroperoxide formation:

| Time, hours | Percent substitution of isopropyl group by hydroperoxy groups |
|---|---|
| 17.3 | 2.1 |
| 42 | 3.3 |
| 73.5 | 7.3 |

A graft of this hydroperoxide (7.3% substituted) of the hydrolyzed p-isopropyl-$\alpha$-methylstyrene—maleic anhydride copolymer was prepared using the following polymerization formula:

| | Parts |
|---|---|
| The above aqueous solution of polymer hydroperoxide | 5.00 |
| Water | 15.8 |
| Acrylonitrile | 2.0 |
| Ferric iron (calculated as Fe but added as sulfate) | 0.00017 |
| Sodium pyrophosphate | 0.015 |
| Dextrose | 0.10 |

The ingredients were charged to a polymerization vessel, air was removed, and the contents were heated to 65° C. for 20 hours. The acrylonitrile was 50% polymerized. The product was a turbid, fluid solution. The particle size was in the colloidal range. The solution exhibited foam stabilization. There was no precipitation when the solution of the graft polymer was diluted with water, methanol, or acetic acid.

*Example 7*

A copolymer of p-isopropyl-$\alpha$-methylstyrene and isobutylene was prepared by cooling a mixture of about 30 parts of each and 240 parts of toluene in a polymerization vessel to −79° C. and adding 0.2 part of boron trifluoride during one hour to the stream of nitrogen passing through the reaction mixture. The temperature was maintained at −76° C. ±3° C. and after 1.5 hours, 10 parts of methanol was added. The reaction mixture was then poured into 3000 parts of methanol with agitation. The precipitated copolymer was collected by filtration, washed twice with methanol, and dried. It was a solid with a somewhat elastic nature and had a specific viscosity of 0.19 (1% benzene). An ultraviolet absorption showed that true copolymerization had occurred.

This copolymer was oxidized by passing oxygen through a reaction mixture comprising 50 parts of the copolymer, 167 parts of tert-butyl benzene, 0.25 part of cumene hydroperoxide initiator, and 0.5 part of calcium hydroxide base stabilizer at 110° C. After 16.5 hours, 12.1% of the isopropyl aryl groups was converted to the corresponding tertiary hydroperoxide.

*Example 8*

Oxygen was bubbled through a mixture of 20 parts of a commercial poly-$\beta$-pinene, 20 parts of tert-butyl benzene, 1 part of dicumene peroxide, and 0.2 part of sodium carbonate at 110° C. for 44 hours. The product was precipitated by pouring the reaction mixture into 400 parts of methanol with agitation. It was then washed with methanol and dried. On analysis the poly-$\beta$-pinene hydroperoxide was found to be 0.48% substituted.

A graft of this poly-$\beta$-pinene hydroperoxide and methyl acrylate was prepared using the following redox polymerization formula:

| | Parts |
|---|---|
| Poly-$\beta$-pinene hydroperoxide | 25 |
| Methyl acrylate | 50 |
| Benzene | 250 |
| Ferric acetylacetonate | 0.005 |
| Benzoin | 0.25 |
| Triethylamine | 0.12 |

The polymerization was carried out at 65° C. for 72 hours. A 57% conversion of the methyl acrylate was obtained.

The polymer hydroperoxides of this invention may be prepared by the oxidation, in liquid phase with a gas containing free oxygen, of any polymer or copolymer of a vinyl, vinylene, or vinylidene monomer which contains an aryl, cycloaliphatic, or heterocyclic nucleus with an oxidizable secondary or tertiary hydrogen attached to the cyclic nucleus or to a carbon adjacent to the cyclic nucleus. Throughout this specification the terms "secondary hydrogen" and "tertiary hydrogen" are used to mean hydrogen attached to a secondary or tertiary carbon, respectively. For example, a polymer of p-ethyl-$\alpha$-methylstyrene has recurring units containing an aryl nucleus with hydrogen attached to a secondary carbon adjacent to the benzene ring and these secondary hydrogens are oxidizable by the process of this invention to produce a polymer hydroperoxide. A polymer of p-isopropyl-$\alpha$-methylstyrene has recurring units containing an aryl nucleus with hydrogen attached to a tertiary carbon adjacent to the benzene ring and hence may be oxidized in accordance with this invention to a polymer hydroperoxide. A polymer of p-cyclohexyl-$\alpha$-methylstyrene has a hydrogen attached to a tertiary carbon adjacent to the aryl nucleus and in addition has hydrogen attached to secondary carbons of the cycloaliphatic ring which may also be oxidized to hydroperoxy groups. In this case, the tertiary hydrogen is believed to be oxidized first. Thus, any polymer containing secondary or tertiary hydrogens attached to a carbon of an alkyl or cycloalkyl substituent and adjacent to an aryl nucleus may be oxidized to a polymer hydroperoxide. In some cases, as, for example, p-isopropylstyrene, there is an oxidizable tertiary hydrogen attached to both a carbon of the polymer chain and also to a carbon of an alkyl substituent on the benzene nucleus and adjacent to the benzene nucleus. While both of these hydrogens may be oxidized, the tertiary hydrogen of the isopropyl group is the one most readily oxidized and hence is oxidized first. Polymers having recurring units containing a heterocyclic nucleus and secondary or tertiary hydrogen attached to a carbon of an alkyl or cycloalkyl substituent and adjacent to the heterocyclic nucleus may be oxidized to a polymer hydroperoxide, as, for example, polymers of ethyl vinyl pyridine, isopropyl vinyl pyridine, the vinyl ether of tetrahydrofurfuryl alcohol, tetrahydrofurfuryl acrylate, etc. The cyclic nucleus in the recurring unit of the polymers may also be a cycloaliphatic nucleus, in which case there are usually both secondary and tertiary hydrogens attached to carbon of the cyclic nucleus and again the tertiary hydrogen is more readily oxidized. For example, a polymer of the vinyl ether of cyclohexanol contains one tertiary hydrogen attached to the cyclic nucleus and several secondary hydrogens. The cycloaliphatic nucleus may also have alkyl substituents, in which case there will be oxidizable hydrogen attached to a carbon adjacent to the nucleus, which hydrogen may be secondary, as in an ethyl, propyl, etc., substituent, or tertiary, as in an isopropyl group, as, for example, a polymer of allyl tetrahydroabietate, p-menthyl-$\alpha$-methylstyrene, etc.

Exemplary of the polymers which may be oxidized to produce the polymer hydroperoxides of this invention are the polymers and copolymers of vinyl, vinylene, and vinylidene monomers which contain a cyclic nucleus and at least one oxidizable hydrogen attached to the cyclic nucleus or to a carbon adjacent to the cyclic nucleus such as p-ethylstyrene, p-isopropylstyrene, p-cyclohexylstyrene, p-menthylstyrene, p-ethyl-α-methylstyrene, m- and p-isopropyl-α-methylstyrene, p-cyclohexyl-α-methylstyrene, p-menthyl-α-methylstyrene, p-nitro-α-methylstyrene, p-isopropyl-α-chlorostyrene, 3-chloro-5-isopropyl-α-methylstyrene, 3-methyl-5-isopropyl-α-methylstyrene, 3-tert-butyl-5-isopropyl-α-methylstyrene, 3-cyano-5-isopropyl-α-methylstyrene, isopropyl vinyl naphthalene, 2-isopropenyl-4-carboxy-6-isopropyl naphthalene, β-pinene, ethyl vinyl pyridine, isopropyl vinyl pyridine; vinyl, allyl and methallyl ethers and acrylic, methacrylic, etc., esters of such alcohols as cyclohexanol, 4-methyl cyclohexanol, p-isopropylbenzyl alcohol, dehydroabietyl alcohol, di- and tetra-hydroabietyl alcohols, tetrahydrofurfuryl alcohol, etc.; vinyl, allyl and methallyl esters of p-isopropylbenzoic acid, dehydroabietic acid, di- and tetrahydroabietic acid, etc.

Another group of polymers that may be oxidized to polymer hydroperoxides are those that are obtained by reducing, at least in part, the aromatic ring contained therein to a cyclohexane ring, as for example, by reduction of polymers of such monomers as styrene, p-methylstyrene, α-methylstyrene, p-methyl-α-methylstyrene, etc., and their homologs. Oxidizable polymers may also be prepared by alkylating already formed polymers containing aromatic rings, as, for example, polystyrene, with propylene, cyclohexene, etc. Also oxidizable for the preparation of the polymer hydroperoxides of this invention are the copolymers of any of the above-mentioned monomers with comonomers which may or may not contain a cyclic nucleus and oxidizable hydrogen which will satisfy the above requirements, as, for example, acrylonitrile, methacrylonitrile, vinyl chloride, vinylidene chloride, styrene, isobutylene, vinyl pyridine, vinyl acetate, allyl acetate, methallyl acetate, maleic anhydride, ethyl fumarate, methyl acrylate, methyl methacrylate, acrylamide, methacrylamide, etc. In addition, many condensation polymers have recurring units which contain a cyclic nucleus and the requisite oxidizable hydrogens and are, therefore, capable of producing polymer hydroperoxides, as, for example, polyesters or polyamides prepared from an isopropyl aryl dibasic acid such as isopropylphthalic acid or from a saturated dibasic acid such as those obtained by the reaction of terpenes with maleic anhydride followed by hydrogenation, etc.

As may be seen from the foregoing examples, the oxidation of the polymer with a gas containing free oxygen to the polymer hydroperoxide may be carried out under a variety of conditions. Usually the oxidation is carried out by passing the oxygen-containing gas through a solution of the polymer in a suitable solvent. Preferably the solvent will be one that is inert under the reaction conditions, as, for example, benzene, chlorobenzene, tert-butylbenzene, normal aliphatic hydrocarbons such as n-pentane, n-hexane, n-heptane, etc. Water is a suitable solvent for the oxidation of water-soluble polymers such as the sodium salt of the copolymer of isopropyl-α-methylstyrene and maleic anhydride. The oxidation may also be carried out by a suspension or emulsion technique, i.e., passing the oxygen-containing gas into a suspension or emulsion of the polymer in an aqueous phase. This method is particularly advantageous in the case of water-insoluble polymers where the viscosity of an organic solution of the polymer would be too great to handle conveniently otherwise. However, the oxidation may be carried out in liquid phase without the use of a solvent or water if the polymer is liquid at the temperature at which the oxidation is carried out.

The oxidation may also be carried out by a co-oxidation procedure, i.e., using as a solvent a compound which is not inert and will itself be oxidized, as, for example, cumene, diisopropylbenzene, p-menthane, etc. This co-oxidative method is frequently desirable in the case of polymers that are not as readily oxidized and where the second hydroperoxide formed is a useful by-product.

It is frequently desirable to add an initiator, particularly in the case of polymers that are difficult to oxidize. With polymers that are easily oxidized, an initiator may be used to speed up the oxidation. Any free radical-generating agent may be used as an initiator for the oxidation, as, for example, hydroperoxides such as cumene hydroperoxide, p-menthane hydroperoxide, diisopropylbenzene monohydroperoxide, etc., peroxides such as dicumene peroxide, di-tert-butyl peroxide, benzoyl peroxide, diacetyl peroxide, etc., persulfates such as sodium persulfate, peroxycarbonates such as diethyl peroxydicarbonate, etc., and nitrogen compounds such as azo-bis(isobutyronitrile), etc. The choice of the initiator and the amount of it to be used will depend on the polymer being oxidized, the ultimate use of the polymer hydroperoxide, etc. For example, if an initiator is desired, as in the case of a more difficultly oxidized polymer, and co-oxidation in an oxidizable solvent is not desirable because of the subsequent purification procedure that may be required, then a comparatively large amount of initiator may be used in an inert solvent. In this case, the initiator chosen should be one that is easily separated from the polymer hydroperoxide or one which does not interfere with whatever use is to be made of the polymer hydroperoxide. For instance, if the polymer hydroperoxide is to be used for the preparation of graft polymers in a redox polymerization system, an initiator may be chosen such as dicumene peroxide, di-tert-butyl peroxide, etc., which initiators do not have to be removed for this use. Less stable initiators such as persulfate, peroxydicarbonates, benzoyl peroxide, etc., which are affected by redox systems, or azo compounds such as azo-bis(isobutyronitrile) may be used if the polymer hydroperoxide that is formed is much more stable so that the reaction mixture can be heated at a high enough temperature to destroy all of the initiator but not affect substantially the polymer hydroperoxide.

A base stabilizer is preferably added to the oxidation reaction mixture but is not required. Exemplary of the bases that may be used are calcium hydroxide, sodium bicarbonate, sodium carbonate, calcium carbonate, ammonia, organic amines such as methylamine, ethylamine, trimethylamine, etc. These bases may be used with or without an aqueous phase present. In some cases, a gaseous base such as ammonia or a soluble base may be preferred in order to eliminate filtering a viscous polymer solution or separating an aqueous phase from a viscous polymer solution.

Any gas containing free oxygen may be used to carry out the oxidation, as, for example, oxygen, air, or any mixtures of oxygen and nitrogen or other inert gases. The process may be operated at atmospheric or superatmospheric pressure and as a batch or continuous process. The temperature at which the oxidation is carried out will depend upon the polymer being oxidized, the method being used, etc., but, in general, will be within the range of from about 20° C. to about 200° C., and preferably from about 60° C. to about 140° C.

The extent to which the oxidation is carried out will depend upon the number of hydroperoxide groups desired in the polymer. The amount of hydroperoxide groups introduced may be varied from 0.1 to 80% of the theoretical value. Hydroperoxide groups may be introduced into polymers of any molecular weight from several monomer units, as, for example, dimers, trimers, tetramers, etc., up to many thousand monomer units.

The isolation of the polymer hydroperoxide will, of course, depend upon the oxidation procedure used. If the oxidation was carried out in an inert solvent medium, the polymer hydroperoxide may be precipitated by pouring the solution into a nonsolvent for the hydroperoxide or by evaporation of the solvent by distillation, etc. If the oxidation was carried out in an aqueous phase system, the polymer hydroperoxide may be removed by filtration if it is insoluble therein, or it may be extracted with a water-immiscible solvent for the hydroperoxide. Many other methods of separating the polymer hydroperoxide are equally operable. If a co-oxidation process was used, it may be desirable to separate the second hydroperoxide from the polymer hydroperoxide. This may be done by pouring the reaction mixture into a solvent in which the second hydroperoxide is soluble but in which the polymer hydroperoxide is insoluble, whereby the latter is precipitated and may be removed by filtration, centrifugation, etc.

By the proper choice of the polymer being oxidized, it is possible to produce a polymer hydroperoxide having almost any desired physical properties. For example, polymer hydroperoxides of high or low molecular weight and with various solubility properties, etc., may be produced. Thus, a water-soluble polymer hydroperoxide can be prepared by copolymerizing a water-insoluble, but readily oxidizable, monomer such as isopropylstyrene, isopropyl-α-methylstyrene, p-cyclohexylstyrene, etc., with a monomer which will contribute water solubility or which can be saponified or altered to give water solubility. Exemplary of the monomers which will contribute water solubility to the polymer, and hence to the polymer hydroperoxide, are such monomers as maleic anhydride, sodium acrylate, sodium methacrylate, methyl acrylate, methyl methacrylate, acrylonitrile, diethylaminoethyl acrylate, carboxystyrene, styrene sulfonic acid, etc. Such copolymers as these may be prepared by free radical polymerization and then can be oxidized in aqueous solution to yield water-soluble polymer hydroperoxides.

The new polymer hydroperoxides of this invention have a wide variety of useful applications that make possible the introduction into a polymer molecule of such groups as ketone, alcohol, ether, aldehyde, peroxide, etc., groups. Such groups may be introduced into the polymer hydroperoxide by acid cleavage, the type of product obtained by the acid cleavage depending upon the polymer, the type of hydroperoxy group present, and the conditions under which the acid cleavage is carried out. Particularly interesting and important is the acid cleavage of polymer hydroperoxides wherein the carbon bearing the hydroperoxide group is attached to an aromatic ring. Acid cleavage of this type of polymer hydroperoxide will yield polymers containing phenolic hydroxyls. Thus, it is possible to produce from certain polymer hydroperoxides of this invention polyphenols, which compounds are difficult to prepare by the methods known in the art in a soluble and high molecular weight form. Examples 2, 3, 4 and 5 illustrate the preparation of polyphenols from low to high phenol content and from low to high molecular weight. In fact, it is possible to produce polyphenols of an entirely new type, e.g., water-soluble polyphenols may be prepared by cleavage of water-soluble hydroperoxides. In the case where there are hydroperoxide-bearing carbon atoms in the polymer chain as well as attached to an aromatic ring as in the case of a polyisopropylstyrene hydroperoxide, acid cleavage will yield a polymer containing both ketone and phenolic groups. Acid cleavage of polymer hydroperoxides which do not contain aromatic rings, as, for example, the hydroperoxide obtained by oxidation of a completely reduced p-methylstyrene polymer, will introduce ketone, alcohol, ester, and aldehyde groups, depending upon the nature of the polymer and the cleavage conditions. It is generally preferred to cleave organic soluble polymer hydroperoxides under substantially anhydrous conditions in an organic solvent such as acetone, methyl ethyl ketone, benzene, chlorobenzene, methyl acetate, acetic acid, etc., by the use of acid catalysts such as sulfuric acid, organic sulfonic acids, trichloroacetic acid, boron trifluoride, sulfur dioxide, acidic ion-exchange resins, acid clays, etc. Water-soluble polymer hydroperoxides may be cleaved by aqueous sulfuric acid if the water-free organic solvent process is not applicable. In many cases it will be desirable to use the same solvent in the acid cleavage step as in the oxidation step in the production of these products from various polymers and thereby eliminate the necessity of isolating the polymer hydroperoxide.

The polymer hydroperoxides of this invention can also be converted to alcohols by the chemical reduction of the hydroperoxide group, as, for example, with sodium sulfide, aluminum plus sodium hydroxide, base-catalyzed decomposition, etc., or by catalytic hydrogenation of the polymer hydroperoxide. Polymeric ketones may be prepared from the polymer hydroperoxides by reacting the latter with metallic reducing agents such as ferrous sulfate, etc. It is also possible to introduce peroxide groups by the thermal decomposition of the hydroperoxide groups of the polymer hydroperoxide either with or without the presence of a metal catalyst. This procedure will increase the molecular weight of the final product and, under certain conditions, give cross-linked insoluble products. These peroxides are useful as free radical sources even though they are cross-linked insoluble products, because they become soluble on thermal decomposition. Peroxide groups may be introduced without any possibility of the products becoming cross-linked by reacting the polymer hydroperoxide with a tertiary alcohol, as, for example, tert-butyl alcohol or α,α-dimethylbenzyl alcohol, etc., in the presence of appropriate acid catalysts.

The polymer hydroperoxides of this invention may be used for the preparation of grafted polymers, as has been demonstrated in Examples 1, 5, 6 and 8. A wide variety of these grafted and extremely useful polymers may be produced and when produced from the polymer hydroperoxides, a much greater number of grafts per polymer unit can be obtained than by any other method of preparing grafted polymers.

The polymer hydroperoxides of this invention may also be used as initiators for polymerizations catalyzed by free radicals, as, for example, polymerization of vinyl compounds such as styrene, methyl methacrylate, butadiene-styrene, etc. That they are excellent catalysts for such polymerization reactions has been demonstrated in Example 4. The use of these polymer hydroperoxides for initiating free radical polymerization reactions makes it possible to modify and improve the properties of the polymers so obtained or to cross-link or vulcanize already formed polymers, as, for example, elastomers such as GR-S and butyl rubber, polyvinyl chloride, etc. Many other uses of the new polymer hydroperoxides of this invention will be found.

What I claim and desire to protect by Letters Patent is:

1. A hydroperoxidized polymer of a vinylidene compound containing a cyclic organic nucleus selected from the group consisting of aryl hydrocarbon, cycloaliphatic hydrocarbon, pyridine and furan nuclei, said polymer being essentially free from aliphatic unsaturation and containing an oxidizable hydrogen selected from the group consisting of hydrogens attached to secondary and tertiary carbons included in a cycloaliphatic nucleus and hydrogens attached to secondary and tertiary carbons in alkyl and cycloalkyl substituents on said cyclic organic nuclei and which are adjacent to a carbon of the cyclic organic nucleus, said hydroperoxidized polymer containing from about 0.5 to about 80 hydroperoxy groups per 100 monomer units and wherein said hydroperoxy groups have replaced said oxidizable hydrogen.

2. A hydroperoxidized polymer of a vinylidene compound containing a cycloaliphatic hydrocarbon nucleus, said polymer being essentially free from aliphatic unsaturation and containing oxidizable hydrogen which is attached to a tertiary carbon included in the cycloaliphatic nucleus, said hydroperoxidized polymer containing from about 0.5 to about 80 hydroperoxy groups per 100 monomer units and wherein said hydroperoxy groups have replaced said oxidizable hydrogen.

3. A hydroperoxidized polymer of a vinylidene compound containing an aryl hydrocarbon nucleus, said polymer being essentially free from aliphatic unsaturation and containing oxidizable hydrogen which is attached to a tertiary carbon in an alkyl substituent on said aryl nucleus and which is adjacent to a carbon of the aryl nucleus, said hydroperoxidized polymer containing from about 0.5 to about 80 hydroperoxy groups per 100 monomer units and wherein said hydroperoxy groups have replaced said oxidizable hydrogen.

4. A hydroperoxidized polymer of a vinylidene compound containing an isopropylaryl nucleus, said polymer being essentially free from aliphatic unsaturation, and said hydroperoxidized polymer containing from about 2 to about 80 hydroperoxy groups per 100 monomer units, wherein said hydroperoxy groups are attached to the tertiary carbon of the isopropyl group of said isopropylaryl nucleus.

5. A hydroperoxidized poly(isopropyl-$\alpha$-methylstyrene) containing from about 2 to about 50 hydroperoxy groups per 100 monomer units, wherein said hydroperoxy groups are attached to the tertiary carbon of the isopropyl group of the isopropyl-$\alpha$-methyl-styrene units.

6. A hydroperoxidized copolymer of an isopropyl-$\alpha$-methylstyrene and a copolymerizable monomer, said copolymer being essentially free from aliphatic unsaturation, and said hydroperoxidized copolymer containing from about 2 to about 80 hydroperoxy groups per 100 monomer units, wherein said hydroperoxy groups are attached to the tertiary carbon of the isopropyl group of the isopropyl-$\alpha$-methyl-styrene units.

7. A hydroperoxidized isopropyl-$\alpha$-methylstyrene-methacrylic acid copolymer, said hydroperoxidized copolymer containing from about 2 to about 80 hydroperoxy groups per 100 monomer units, wherein said hydroperoxy groups are attached to the tertiary carbon of the isopropyl group of the isopropyl-$\alpha$-methylstyrene units.

8. A hydroperoxidized hydrolyzed isopropyl-$\alpha$-methylstyrene-maleic anhydride copolymer, said hydroperoxidized copolymer containing from about 2 to about 80 hydroperoxy groups per 100 monomer units, wherein said hydroperoxy groups are attached to the tertiary carbon of the isopropyl group of the isopropyl-$\alpha$-methylstyrene units.

9. A hydroperoxidized isopropyl-$\alpha$-methylstyrene-isobutylene copolymer, said hydroperoxidized copolymer containing from about 2 to about 80 hydroperoxy groups per 100 monomer units, wherein said hydroperoxy groups are attached to the tertiary carbon of the isopropyl group of the isopropyl-$\alpha$-methylstyrene units.

10. The process of preparing a hydroperoxidized polymer of a compound containing a cyclic organic nucleus selected from the group consisting of aryl hydrocarbon, cycloaliphatic hydrocarbon, pyridine and furan nuclei, said polymer being essentially free from aliphatic unsaturation and containing an oxidizable hydrogen selected from the group consisting of hydrogens attached to secondary and tertiary carbons included in a cycloaliphatic nucleus and hydrogens attached to secondary and tertiary carbons in alkyl and cycloalkyl substituents on said cyclic organic nuclei and which are adjacent to a carbon of the cyclic organic nucleus, which comprises oxidizing said polymer in liquid phase at a temperature of from about 20° C. to about 200° C. by passing a gas containing free oxygen through the liquid phase until the hydroperoxidized polymer contains from about 0.5 to about 80 hydroperoxy groups per 100 monomer units.

11. The process of preparing a hydroperoxidized polymer of a compound containing an aryl hydrocarbon nucleus, said polymer being essentially free from aliphatic unsaturation and containing hydrogen which is attached to a tertiary carbon in an alkyl substituent on said aryl nucleus and which is adjacent to a carbon of the aryl nucleus, which comprises oxidizing said polymer in liquid phase at a temperature of from about 20° C. to about 200° C. by passing a gas containing free oxygen through the liquid phase until the polymer contains from about 0.5 to about 80 hydroperoxy groups per 100 monomer units.

12. The process of preparing a hydroperoxidized polymer of a compound containing an isopropylaryl nucleus, said polymer being essentially free from aliphatic unsaturation, which comprises oxidizing said polymer in liquid phase at a temperature of from about 20° C. to about 200° C. by passing a gas containing free oxygen through the liquid phase until the polymer contains from about 0.5 to about 80 hydroperoxy groups per 100 monomer units.

13. The process of preparing a hydroperoxidized poly(isopropyl-$\alpha$-methylstyrene) which comprises oxidizing said polymer in liquid phase at a temperature of from about 20° C. to about 200° C. by passing a gas containing free oxygen through the liquid phase until the polymer contains from about 0.5 to about 80 hydroperoxy groups per 100 monomer units.

14. The process of preparing a hydroperoxidized copolymer of an isopropyl-$\alpha$-methylstyrene and a copolymerizable monomer, said copolymer being essentially free from aliphatic unsaturation, which comprises oxidizing said copolymer in liquid phase at a temperature of from about 20° C. to about 200° C. by passing a gas containing free oxygen through the liquid phase until the polymer contains from about 0.5 to about 80 hydroperoxy groups per 100 monomer units attached to the tertiary carbon of the isopropyl group of the isopropyl-$\alpha$-methylstyrene units.

15. The process of preparing a hydroperoxidized poly(isopropyl-$\alpha$-methylstyrene) which comprises oxidizing poly(isopropyl-$\alpha$-methylstyrene) by passing a gas containing free oxygen into a solution of poly(isopropyl-$\alpha$-methylstyrene) in an inert solvent at a temperature of from about 20° C. to about 200° C. in the presence of an oxidation initiator and an alkaline stabilizing agent until the polymer contains from about 0.5 to about 80 hydroperoxy groups per 100 monomer units.

16. The process of preparing a hydroperoxidized copolymer of an isopropyl-$\alpha$-methylstyrene and a copolymerizable monomer which comprises oxidizing said copolymer by passing a gas containing free oxygen into a solution of said copolymer in an inert solvent at a temperature of from about 20° C. to about 200° C. in the presence of an oxidation initiator and an alkaline stabilizing agent until the polymer contains from about 0.5 to about 80 hydroperoxy groups per 100 monomer units attached to the tertiary carbon of the isopropyl group of the isopropyl-$\alpha$-methylstyrene units.

References Cited in the file of this patent

UNITED STATES PATENTS

| | | |
|---|---|---|
| 2,395,523 | Vaughan et al. | Feb. 26, 1946 |
| 2,461,966 | Davis | Feb. 15, 1949 |

(Other references on following page)

UNITED STATES PATENTS

| | | |
|---|---|---|
| 2,525,628 | Young | Oct. 10, 1950 |
| 2,762,790 | Greene | Sept. 11, 1956 |

FOREIGN PATENTS

| | | |
|---|---|---|
| 641,250 | Great Britain | Aug. 9, 1950 |
| 654,035 | Great Britain | May 30, 1951 |
| 665,897 | Great Britain | Jan. 30, 1952 |
| 483,614 | Canada | May 27, 1952 |

OTHER REFERENCES

Schmidt et al.: "Principles of High Polymer Theory and Practice," pp. 522–25, 1948, McGraw-Hill. (Copy in Sci. Lib.)

Barnes et al.: J.A.C.S., 72, 210–15 (1950).

Fisher et al.: Ind. Eng. Chem., March 1951 (pp. 671–4).

Boundy Boyer: Styrene, 1952, pp. 650–51, Reinhold Publishing Corp., New York. (Copy in Div. 60.)

UNITED STATES PATENT OFFICE
CERTIFICATE OF CORRECTION

Patent No. 2,911,391                                  November 3, 1959

Edwin J. Vandenberg

It is hereby certified that error appears in the printed specification of the above numbered patent requiring correction and that the said Letters Patent should read as corrected below.

Column 13, line 64, and column 14, lines 7 and 19, before "compound", each occurrence, insert -- vinylidene --.

Signed and sealed this 19th day of April 1960.

(SEAL)
Attest:

KARL H. AXLINE
Attesting Officer

ROBERT C. WATSON
Commissioner of Patents